United States Patent [19]

Huppee

[11] Patent Number: 4,605,200
[45] Date of Patent: Aug. 12, 1986

[54] FAUCET VALVE

[76] Inventor: Robert Huppee, 1910 Thierry Street, Brossard, Canada, J4W 2M8

[21] Appl. No.: 595,656

[22] Filed: Apr. 2, 1984

[30] Foreign Application Priority Data

Mar. 28, 1984 [CA] Canada ............................ 450672

[51] Int. Cl.$^4$ .......................................... F16K 31/524
[52] U.S. Cl. ....................................... 251/258; 137/523; 137/606; 222/505; 251/262; 251/228; 251/900
[58] Field of Search ............... 251/257, 228, 262, 263, 251/40, 298, 83, DIG. 1, 258, 259, 261; 137/606, 603, 523; 222/144.5, 505

[56] References Cited

U.S. PATENT DOCUMENTS

| | | | |
|---|---|---|---|
| Re. 20,576 | 12/1937 | Sloan | 251/40 X |
| 1,291,939 | 1/1919 | Laubach | 137/606 |
| 1,712,298 | 5/1929 | Ford | 251/83 X |
| 1,832,723 | 11/1931 | Mueller | 137/606 |
| 2,552,033 | 5/1951 | Bradbury | 251/228 X |
| 2,622,435 | 12/1952 | Lucas et al. | 251/228 X |
| 2,634,748 | 4/1953 | Morrison | 251/83 X |
| 2,869,582 | 1/1959 | Skipwith, Jr. | 251/257 X |
| 3,117,589 | 1/1964 | Billeter | 251/263 X |
| 3,265,373 | 8/1966 | Walker et al. | 251/257 X |
| 3,398,927 | 8/1968 | Rüter | 251/228 |
| 3,494,589 | 10/1970 | Mumma . | |
| 3,937,441 | 10/1976 | Baumann . | |
| 4,134,573 | 1/1979 | Messinger | 251/DIG. 1 X |

FOREIGN PATENT DOCUMENTS

| | | |
|---|---|---|
| 800472 | 3/1968 | Canada . |
| 1132451 | 12/1982 | Canada . |
| 622016 | 6/1961 | Italy ............................ 251/DIG. 1 |

*Primary Examiner*—Alan Cohan
*Assistant Examiner*—Stephen Hepperle

[57] ABSTRACT

A faucet valve comprised of a valve body having a valve seat onto which is adapted to movably and freely rest a disc-shaped valve plug. An operant shaft having a central cam surface is journalled within the valve body, being arranged with the cam surface lying adjacent to the valve plug so that rotating or sliding the shaft causes the plug to tip off the valve seat. The plug is held in closed position solely by upstream pressure. A novel check valve is also disclosed for replacement of the standard washer in a faucet and for use with a "speedway" connection according to another embodiment. The faucet valve is adapted to be fixed to the spout of a tap assembly having hot and cold water, in combination with the check valve, the latter preventing backflow between the two faucet conduits in the event of a pressure differential. The faucet valve may be used independently as may the check valves. In combination, the faucet valve and check valves eliminate the need to adjust the faucets for a desired water temperature for each use. The faucet valve, when mounted on the common spout of the two faucets and being easily accessible and actuated, serves to eliminate water waste. In another embodiment, the faucet valve is a flow directional valve used, for instance, to feed water to a water treatment apparatus when shutting off the spout.

5 Claims, 27 Drawing Figures

U.S. Patent  Aug. 12, 1986  Sheet 1 of 5  4,605,200
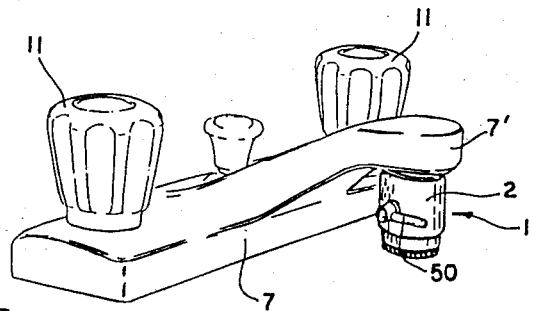
FIG. 1
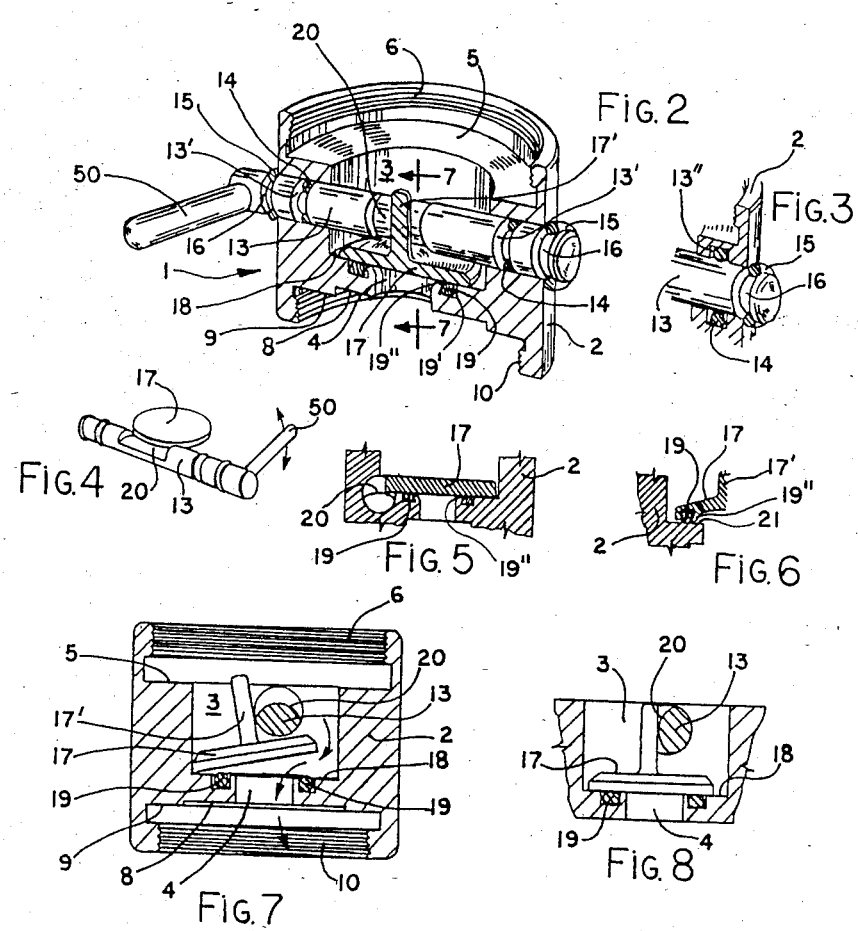

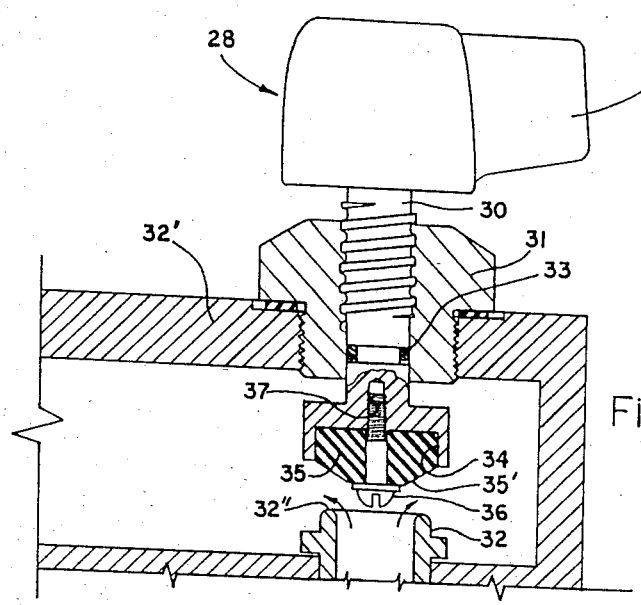
FIG. 11 PRIOR ART
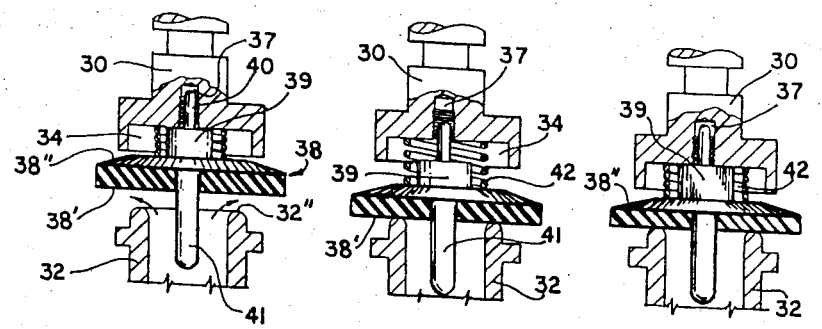
Fig.12  Fig.13  Fig.14
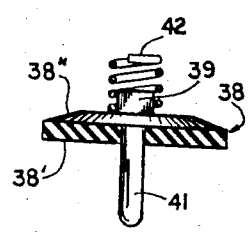 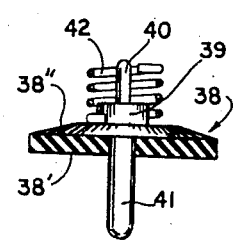 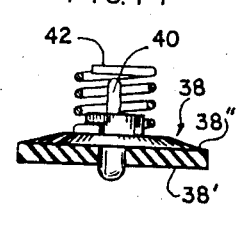
Fig.16  Fig.15  Fig.17

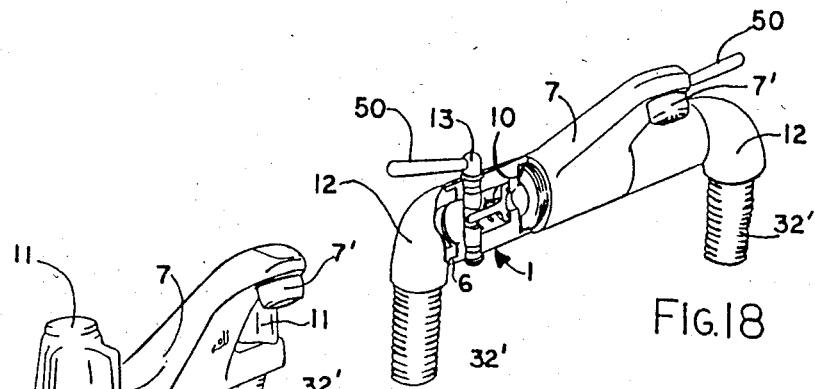
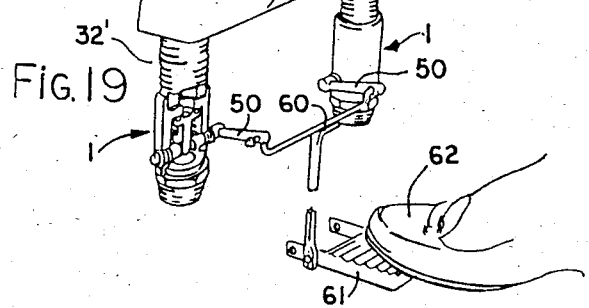
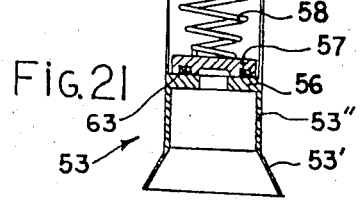
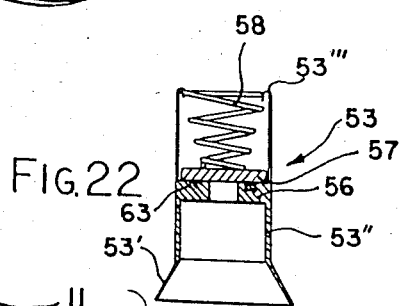
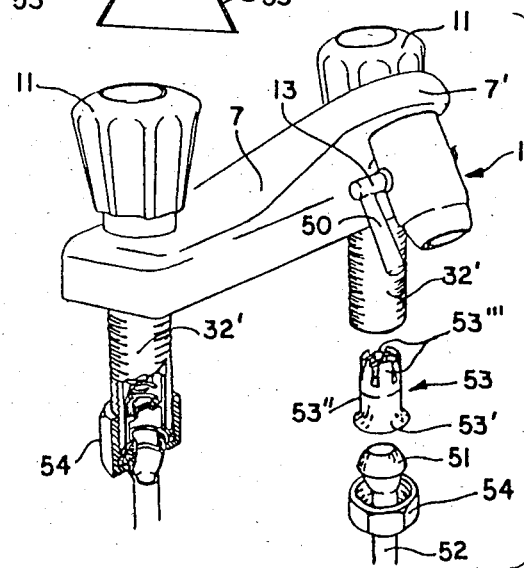
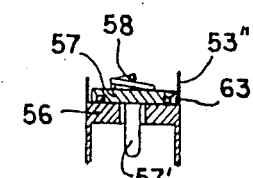
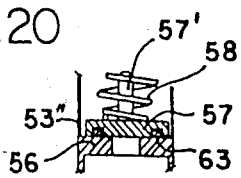

FAUCET VALVE

FIELD OF THE INVENTION

This invention relates to valve means for opening, closing and regulating the flow of liquids through conduits, specifically to a valve of novel construction adapted to such purpose.

BACKGROUND OF THE INVENTION

In homes as well as in certain industrial applications, a single tap outlet is used to dispense liquids from two or more faucets which are most often manually controlled. The most common tap outlet used is the one for cold and hot water installed over a sink in kitchens, washrooms, etc.

The drawback of single tap outlets is that the faucets have to be adjustably opened and shut each time the tap is needed. For some people, this can be a nuisance resulting in impatient adjustment of the faucets and, consequently, a flow of water which is, for example, in a kitchen excessive and/or too hot or too cold. In industrial uses of such taps, a worker may have a similar reaction again resulting in a liquid flow which does not correspond to the operational requirement and which wastes liquid.

OBJECTS OF THE INVENTION

Accordingly, it is the main object of the present invention to provide a shut-off valve which can be easily secured to the tap outlet of a tap connected to at least two faucets and which is adapted to instantly shut off or open the combined flow of liquid from the two faucets without having to adjust the faucets for each use of the tap.

It is another object of the invention to provide a shut-off valve which is long-lasting, sturdy, and of extremely simple design.

It is another object of the invention to provide a shut-off valve which is a directional flow valve to feed, for instance, water to a water treatment apparatus when shutting off the tap outlet.

It is a further object of the invention to provide a novel check valve adapted to be used either independently in a faucet as a replacement for the standard rubber washer in the faucet or cooperatively with the shut-off valve to prevent back-flow from one faucet into the other when a pressure differential between the two faucets occurs.

SUMMARY OF THE INVENTION

The above and other objects and advantages of the present invention are realized according to several preferred embodiments. A first embodiment contemplated by the invention comprises a unitary valve body of tubular shape having a large upstream lengthwise bore and a smaller downstream bore communicating with the upstream bore centrally. The annular step defined by the meeting of the two bores constitutes a valve seat.

A disc-shaped valve plug is adapted to movably and sealingly rest on the valve seat. An O-ring sealing element is provided therebetween to ensure that no liquid will flow past the valve plug when the latter is in fully closed position. The valve plug is not connected to any other element and freely, sealingly lies on the valve seat solely by upstream liquid pressure acting on its upstream face.

An operant shaft extends through the large bore crosswise and parallel to the plane of the valve plug. The shaft is also radially offset from the longitudinal axis of the valve body and consequently of the valve plug. The central portion of the operant shaft is formed with at least one radially recessed cam surface, which cam surface is adapted to extend adjacent to an axial pin formed on the valve plug when the latter is in closed position. Thus, when the operant shaft, which is rotatively journalled at both its end positions in the valve body, is made to rotate, the cam surface will move away from the axial pin of the valve plug and the full diameter of the shaft will be brought into contact with the axial pin, thereby tipping the latter laterally which causes the valve plug to angularly rise off the valve seat. By simply rotating the operant shaft in the opposite direction, the valve plug can be reshut by the upstream pressure in the large bore.

According to other preferred embodiments, the operant shaft can be positioned adjacent the valve seat and tangentially to the disc of the valve plug whereby one edge of the latter can be moved away from the valve seat by the central cam surface. Or, two recessed cam surfaces can be formed as diametrically opposite arcs at the central portion of the operant shaft. Still another embodiment provides for an operant shaft which is slidable along its longitudinal axis to effect displacement of the valve plug.

It is also within the scope of the invention to provide a check valve adapted for use as a replacement for the standard resilient washer and its fastening screw at each faucet. The check valve includes a disc made of suitable material preferably having a diameter wider than the diameter of the valve seat. The disc is formed with a central and perpendicular guide member projecting into the entry pipe of the faucet. The downstream face of the disc is also formed with a central and round protruding cap. The latter is adapted to orient a preferably removable upstream-directed biasing means of predetermined strength which serves to keep the disc in sealing contact against the valve seat in the absence of flow. The valve disc is further preferably formed with a guide pin fixed at one end to the cap and having a free opposite end extending into the vacant threaded hole of the washer screw. The guide pin stabilizes the disc during axial displacement thereof.

The present invention further provides a modified check valve designed for use in the conventional connection between each inlet pipe of the mixing faucet assembly and the hot and cold water feeding copper tubings. This modified check valve also essentially comprises a disc adapted to move to and away from a valve seat formed in the female portion of this conventional connection. Another upstream-directed biasing means is provided for the disc.

Both of these check valves are envisioned as a means to prevent back flow of liquid from one of the faucets to another when the latter are connected to a common tap. Thus, when the shut-off valve of the invention is attached to the tap downstream of the faucets, the check valves can be used in combination therewith.

In another embodiment of the shut-off valve, the operant shaft of the latter has a liquid passage which opens within the valve body when the valve plug is in closed position. The valve thus becomes a directional flow valve.

These and other features of the present invention will be more fully described and disclosed in the following specification, the accompanying drawings and the appended claims.

BRIEF DESCRIPTION OF THE DRAWINGS

FIG. 1 is a prespective view of the shut-off valve of the invention installed at the common spout of a dual faucet assembly;

FIG. 2 is a lengthwise cross-sectional projectional view of the valve, showing the valve plug in closed position;

FIG 3. is a fragmentary view of the right side portion of the operant shaft of FIG. 2 showing an alternate operant shaft seal;

FIG. 4 is a projection view of a second embodiment of the operant shaft and valve plug;

FIG. 5 is a cross-sectional elevation of the operant shaft and valve plug of FIG. 4 in place in the valve body;

FIG. 6 is a cross-sectional elevation of a third embodiment of the valve plug showing a portion thereof against the valve seat;

FIG. 7 is a cross-sectional view taken along line 7—7 of FIG. 2 but showing the valve plug in open position.

FIG. 8 is a view similar to that of FIG. 7 but showing the valve plug in closed position;

FIG. 11 is a cross-sectional elevation of a standard faucet assembly in open position;

FIGS. 12 to 14 inclusively are cross-sectional elevations of a check valve installed in the faucet of FIG. 11 in lieu of the washer and its retaining screw, showing the faucet in open position and two modes of closed position, respectively;

FIGS. 15 to 17 inclusively are cross-sectional elevation views of first, second and third embodiments of the check valve, respectively.

FIG. 18 is a perspective view, partly broken away, of the first embodiment of the shut-off valve installed in a dual tap as an alternate faucet;

FIG. 19 is another perspective view, partly broken away, showing the shut-off valve of FIG. 18 installed upstream of the two faucets of a standard faucet assembly, also showing the shut-off valves linked to a foot pedal;

FIG. 20 is another perspective view, partly broken away and partly exploded, of a standard faucet assembly provided with a shut-off valve at the tap spout in combination with a modified check valve used in the conventional connections between the pipes of the faucet assembly and the hot and cold water copper tubings.

FIGS. 21 to 24 inclusively are elevation views of various embodiments of the check valve of FIG. 20;

FIGS. 9 and 10, is a perspective view, partially in cross-section, of a modified embodiment of the shut-off valve used as a directional flow valve, shown with the shaft in by-pass passage closing position;

Like numerals refer to like elements throughout the drawings.

DETAILED DESCRIPTION OF THE PREFERRED EMBODIMENTS

Figure 9:
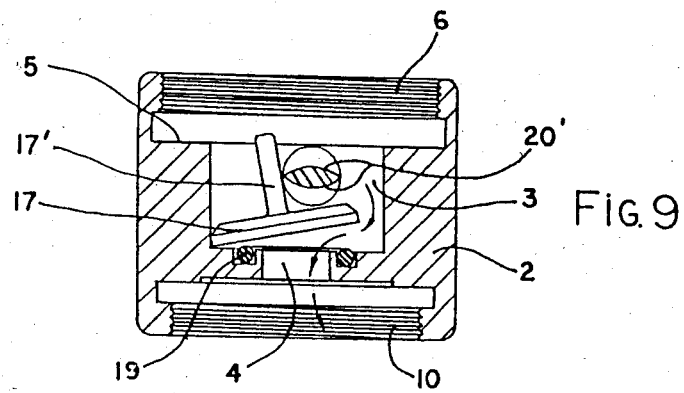
FIG. 9 is another view similar to that of FIG. 7, showing the valve plug in open position but with a double cam surface of the operant shaft.

Referring firstly to FIGS. 1 to 3, there is shown a first embodiment of the shut-off valve 1. Valve 1 is comprised of a valve body 2 which is of a tubular shape and has a large upstream bore 3 formed lengthwise therein and a smaller downstream bore 4 communicating centrally with large bore 3.

The upstream end portion of bore 3 widens out at 5 and is provided thereat with an internally threaded annular flange 6, which flange 6 is of a diameter suitable for attachment to the spout 7' of a tap 7. Normally, the external threading of spout 7' is intended for the attachment of an aerator screen (not shown) according to known practice.

The downstream end portion of valve body 2 also preferably widens at 8 and 9 and another internally threaded annular flange 10 is provided thereat. Flange 10 is adapted for the installation shown by way of example in FIG. 18 wherein the shut-off valve can entirely replace a standard hand-operated faucet 11, being screwed to the pipe elbow joint 12 and wherein flange 10 is threadedly engaged with the tap portion 7. Alternatively, flange 10 can, of course, be externally threaded to receive the aerator screen.

Referring now to FIG. 2, there is further shown an operant cylindrical shaft 13 which extends crosswise through large bore 3 and which is rotatably journalled within valve body 2 at either end. Shaft sealing means to prevent any escape of fluid around shaft 13 are provided, consisting of an O-ring seal 14 in a cross-sectionally square circumferential groove 13' made in both end portions of shaft 13. FIG. 3 shows another embodiment of the sealing means, differing in that the circumferential groove 13" is made in both end portions of body 2. Shaft 13 is held in position by a pair of snap rings or "O" rings 15 engaged in corresponding circumferential grooves 16 located immediately exteriorly of valve body 2.

One end of shaft 13 is provided with a perpendidular handle 50.

A valve plug 17 is freely disposed within large bore 3, having the form of a flat disc. In closed position, plug 17 rests on a valve seat 18 defined by the annular step between bore 3 and bore 4. Sealing means eliminate leakage of the valve when plug 17 is in closed position, consisting of another O-ring seal 19 which can be located in a circular groove 19' made in either the downstream surface of valve plug 17, or in a circular groove 19' formed in valve seat 18. FIGS. 2, 5, 7, 8 and 9 illustrate the latter embodiment, while FIG. 6 illustrates the former. As shown in FIGS. 2, 5 and 6, the lip 19' circular groove 19' is punched in over the O-ring 19 to mechanically retain the latter within the recess. Plug 17 further includes an upstream-projecting axial pin 17'.

The central portion of shaft 13 has a radially recessed cam surface 20, as shown in FIGS. 2, 7 and 8 which extends over slightly more than half the shaft circumference.

As clearly seen in FIGS. 7 and 8, operant shaft 13 is offset from a diameter of bore 3 and extends parallel to the plane of plug 17 when the latter is in closed position, such that cam surface 20 extends adjacent to axial pin 17'. Thus, rotating shaft 13 so as to bring its full diameter surface to bear against axial pin 17' will tip valve plug 17 away from valve seat 18, thereby opening the valve which then remains open. If the shaft 13 is rotated from the closed valve position of FIG. 8 to an extent such that pin 17' still contacts cam surface 20, then the valve will automatically close upon release of handle 50 under the action of water pressure exerted on the valve plug 17. It will be noted that the diameter of plug 17 is only slightly less than the diameter of bore 3, so that releasing plug 17 by handle 50 will allow plug 17 to re-shut on the valve seat substantially concentrically.

FIGS. 4 and 5 depict a different embodiment of plug 17 and shaft 13 wherein the latter extends through valve body 2 semi-tangentially to plug 17 and the latter being in the form of a simple disc without any axial pin 17'.

As shown in FIG. 9, operant shaft 13 can be provided with two cam surfaces 20' which are diametrically opposite one another, so that valve plug 17 closes for two rotated positions of shaft 13 instead of only one such position.

Figure 10:
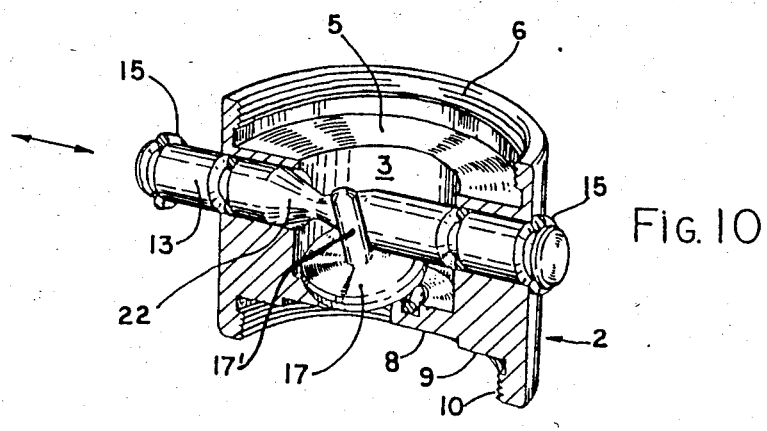
FIG. 10 is a cross-sectional projection view of a third embodiment of the operant shaft in position in the valve body.

In FIG. 10 is shown a third embodiment of operant shaft 13 wherein it is longitudinally slidable instead of rotatable in valve body 2. In this embodiment, longitudinal motion of the shaft is limited by the snap rings 15 and the middle cam portion is replaced by two inwardly-tapering conical cam surfaces 22. The shaft seals are identical to the previous ones discussed. Thus, shaft 13 can be slid in either longitudinal direction to open and close the valve. In all embodiments, the operant shaft 13 and plug 17 can be easily removed by the user for repair or part replacement. The embodiment of FIG. 6 is preferred, since only plug 17 has to be replaced if the O-ring is defective.

Referring now to FIGS. 11 to 17 inclusively, there is shown a standard faucet assembly 28 (FIG. 11) and various embodiments of a check valve for use therewith according to the invention.

Faucet assembly 28 includes a manual knob 11 which is attached to an externally-threaded faucet spindle 30. The latter is threadedly engaged in a collar 31 which is in turn rigidly threaded into the mating end portion of a conduit 32' communicating with an inlet pipe 32. O-ring sealing means 33 are provided to eliminate leakage between collar 31 and spindle 30 as the latter is formed thereat with an open tubular cavity 34 which faces upstream. Cavity 34 retains a standard semi-resilient washer 35 having a conical seat surface 35'. The washer 35 is kept in place by a retaining screw 36 which extends into a threaded central hole 37 (cf. FIGS. 11-14). All of this construction is known.

The check valve according to the invention is adapted to replace washer 35 and screw 36, consisting of a disc valve 38, made of semi-resilient material, such as one of the rubber compounds. Disc valve 38 is substantially of a wider diameter than its valve seat 32", having a flat sealing face 38' and a downstream frusto-conical face 38". The center of face 38" is provided with a projecting round cap 39, which is in turn formed with a downstream-projecting pin 40. Face 38' has integrally formed therewith a guide pin 41 which projects upstream into inlet pipe 32. As shown in FIGS. 12 to 17, disc valve 38 may have caps 39 of varying diameters, may have guide pins 41 of varying lengths and may or may not have a pin 40.

Disc valve 38 is furnished with an upstream-directed biasing means preferably embodied by a helical compression spring 42, which spring is of predetermined resistance to compression. One end of spring 42 abuts face 38" around cap 39; the other end of the spring abuts the downstream end of cavity 34.

Spring 42 has a slight resistance to compression, sufficient to seat disc valve 38 under conditions of no flow. Thus, if disc valve 38 is destined for use in combination with the shut-off valve at a tap spout 7', as disclosed hereabove, opening the corresponding faucet will allow liquid to flow into the tap, since the liquid pressure overcomes the tension of spring 42, as indicated by the arrows of FIG. 12. Should unequal pressure exist between the two faucets, it will be clear that liquid from the higher pressure faucet will tend to flow counter-stream into the other faucet. When the liquid reaches the latter faucet, it will impinge on face 38", thereby automatically closing disc valve 38 (cf. FIG. 13) even though the latter faucet is still open.

Being a replacement for washer 35, disc valve 38 will function just as efficiently and can be shut by closing the faucet in the usual manner as suggested in FIG. 14.

Modified embodiments of the check valve designed for use with the conventional connection of the pipes of the mixing faucet assembly with the water feeding copper tubings, as shown in FIGS. 20 to 24 inclusively.

The "conventional" connection includes the bulbous ferrule 51 fitted over the end of an copper tubing 52, a modified female portion 53 adapted to receive bulbous ferrule 51 and a fastening nut 54 which is threadable onto the lower end portion of faucet inlet pipe 32.

Modified female portion 53 includes an outwardly-flared upstream end 53' and a tubular portion 53' extending downstream therefrom terminating in a plurality of lengthwise circumferential tabs 53'''. Approximately mid-length of portion 53" an annular valve seat 56 is disposed transversely of the tubular portion 53. A valve disc 57 is adapted to movably seat on seat 56 and O-ring sealing means 63 are provided either on seat 56 (FIG. 22) or in the sealing face of disc 57 (FIGS. 21, 23 and 24). Similar to the first disclosed check valve, valve disc 57 is provided with biasing means to urge the disc towards seat 56 and again consisting of a compression spring 58. One end of the latter is secured to the downstream face of disc 57 and the other end to every second tab 53''', the latter being crimped inwardly to hold spring 58 in position.

FIGS. 23 and 24 illustrate two other embodiments of valve disc 57 wherein an axial pin 57' is provided for stabilizing purposes projecting upstream and downstream, respectively.

Referring to FIGS. 18 and 19, there are shown two applications practically realized by the invention: FIG. 18 shows how the shut-off valve can be used as a replacement for a standard faucet, being mounted between an elbow joint 12 and the tap 7; FIG. 19 illustrates how the handles 50 of two shut-off valves disposed upstream of their respective faucets can be joined by a link member 60, which link is connected to pedal 61 adapted to be operated by a foot 62.

Figure 25:
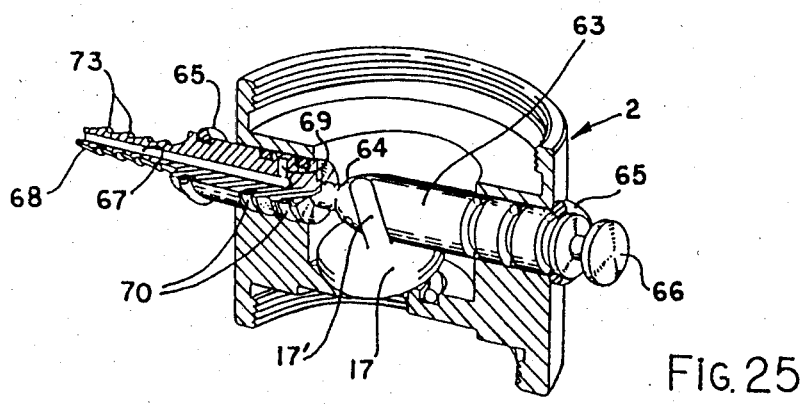
FIG. 25, found on the page of drawings containing
Figure 26:
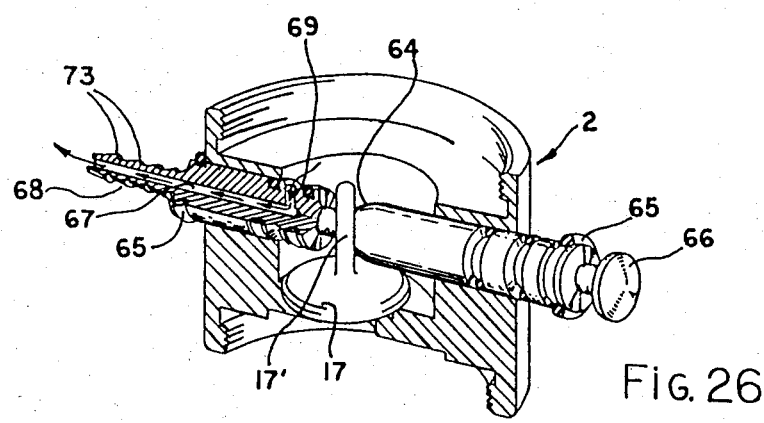
FIG. 26 is a view similar to that of FIG. 25, with the shaft in by-pass passage opening position.
Figure 27:
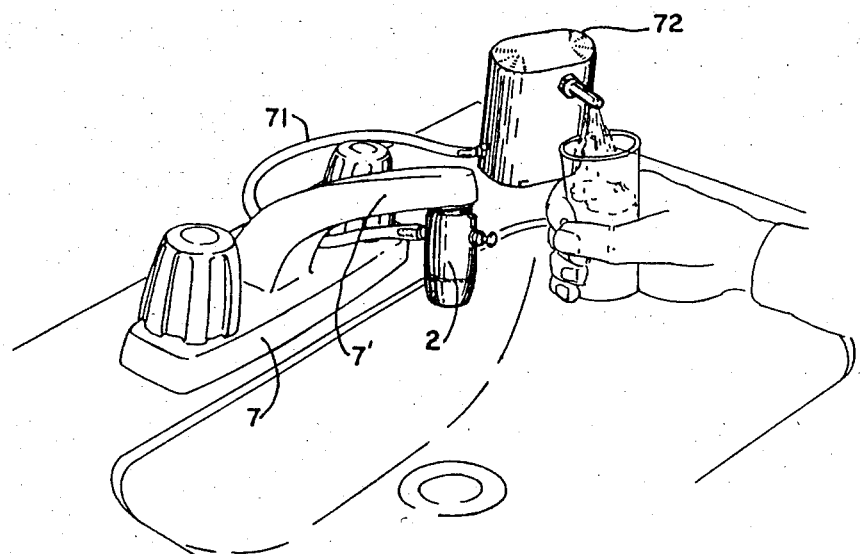
FIG. 27 is a perspective view of the flow directional valve as installed on the common spout of a dual faucet assembly.

FIGS. 25, 26 and 27 show a modified embodiment of the shut-off valve for use as a directional flow valve. In this embodiment, the valve body 2 is the same as in the embodiment of FIG. 10 and also the valve plug 17. However, the operant shaft 13 is replaced by operant shaft 63 modified as follows: the two inwardly-tapering conical surfaces 22 of FIG. 10 are replaced by a single conical surface portion 64 and the position of the movement limiting O-rings 65 of the operant shaft 63 are such that when shaft 63 is pushed in one axial direction, the stem of valve plug 17 engages the maximum diameter portion of the shaft causing valve plug 17 to take an open position, as shown in FIG. 25, and when the operant shaft 63 is pulled in the opposite direction by knob 66, the valve plug 17 is allowed to take its closed position, as shown in FIG. 26.

The operant shaft 63 is further provided at its end, remote from knob 66, with an axial passage 67 opening to the exterior at the outer end of an axial extension 68 of the operant shaft 63, the passage 67 having a right angle passage portion 69 opening at the cylindrical outer surface of the operant shaft in between two O-ring seals 70.

The arrangement is such that passage 67, 69 is closed by the bore wall of the body 2 receiving the shaft 63 when said shaft is in valve-plug opening position as shown in FIG. 25, and is in communication with the interior bore 3 of the body 2 when the shaft 63 is in valve-plug closing position, as shown in FIG. 26.

FIG. 27 shows one application of the directional flow valve wherein body 2 is attached to the spout 7' of a tap 7, while the shaft passage 67, 69 is adapted to feed water through a flexible tube 71 to a water-treating apparatus 72, having its own shut-off valve and adapted to treat water before using it as drinking water.

Preferably, the extension 68 of the shaft 63 is provided with barbs 73 for secure attachment of the flexible tube 71 thereto.

Obviously, the same by-pass principle could be adapted for the shut-off valve in which the shaft is rotatable instead of being axially movable.

I claim:

1. A shut-off valve comprising a tubular valve body, having a larger diameter upstream bore defining an inlet and a smaller diameter downstream bore centrally communicating with said upstream bore and defining an outlet and an upstream facing annular valve seat, a valve member including a disc-shape valve plug of a diameter intermediate the diameters of said upstream and downstream bores, and formed with an upstream projecting axial pin, said valve member entirely located within said upstream bore and freely supported on said valve seat and movable between valve-opening and valve-closing positions, said valve plug having a downstream face facing said valve seat, one of said valve seat and said downstream face having a circular groove, an O-ring seal positioned and mechanically retained in said groove and making sealing contact with one of said downstream face and valve seat, respectively, in the valve-closing position of said valve member; an operant cylindrical shaft removably extending transversely of said valve body across and exposed within said upstream bore, said shaft lying in a plance parallel to the plane of said valve seat and laterelly offset from the longitudinal axis of said bores, said shaft having an end projecting from said tubular valve body and movable relative to said body and valve member by a force applied to said projecting end, means to releasably retain said shaft in said valve body, sealing means between said shaft and said valve body at both sides of said upstream bore, said shaft having a central portion of reduced diameter, defining a cam surface merging with the full diameter surface of said shaft, said cam surface and said full diameter shaft surface selectively (engageable with) slidably contacting said (valve member) axial pin upon movement of said shaft in said valve body to permit said valve member to take its valve-closing position under liquid pressure and to tilt said valve plug on its valve seat to valve-opening position respectively.

2. A shut-off valve as defined in claim 1, wherein said operant shaft is rotatably mounted in said valve body and said cam surface includes a surface portion of progressively-increasing radius relative to the shaft axis, and further including a handle fixed to the projecting end of said shaft and generally perpendicular to the latter.

3. A shut-off valve as defined in claim 1, wherein said shaft is longitudinally slidable in said valve body and both its ends project from said valve body and said cam surface is in the form of two inwardly-converging, generally conical portions.

4. A shut-off valve as defined in claim 1, wherein said circular groove has a radially inner side defined by a lip, said lip punched in over said O-ring and partially overlying the latter.

5. A shut-off valve as defined in claim 4, wherein said circular groove is made in the downstream face of said valve plug.

* * * * *